(12) United States Patent
Kikuchi et al.

(10) Patent No.: US 8,034,506 B2
(45) Date of Patent: Oct. 11, 2011

(54) FUEL CELL

(75) Inventors: Hideaki Kikuchi, Kawachi-gun (JP);
Narutoshi Sugita, Utsunomiya (JP);
Norimasa Kawagoe, Utsunomiya (JP);
Masaru Oda, Utsunomiya (JP); Takashi Kosaka, Utsunomiya (JP); Takeshi Banba, Shioya-gun (JP); Yasuhiro Watanabe, Kawaguchi (JP)

(73) Assignee: Honda Motor Co., Ltd., Tokyo (JP)

( * ) Notice: Subject to any disclaimer, the term of this patent is extended or adjusted under 35 U.S.C. 154(b) by 125 days.

(21) Appl. No.: 11/712,738

(22) Filed: Mar. 1, 2007

(65) Prior Publication Data
US 2007/0207372 A1    Sep. 6, 2007

(30) Foreign Application Priority Data
Mar. 2, 2006    (JP) .................... 2006-055735

(51) Int. Cl.
*H01M 2/38* (2006.01)
(52) U.S. Cl. ............ 429/457; 429/456; 429/458
(58) Field of Classification Search ............ 429/34, 429/38, 39, 456, 457, 458
See application file for complete search history.

(56) References Cited

U.S. PATENT DOCUMENTS

| 3,833,424 | A  | * | 9/1974  | Louis et al. ............... 429/37 |
| 2004/0180248 | A1 |   | 9/2004  | Matsubayashi et al. |
| 2005/0048342 | A1 |   | 3/2005  | Wakahoi et al. |
| 2005/0084731 | A1 |   | 4/2005  | Nishimura et al. |
| 2005/0118489 | A1 | * | 6/2005  | Frederiksen et al. ......... 429/38 |
| 2005/0221151 | A1 | * | 10/2005 | Suzuki et al. ............. 429/38 |

FOREIGN PATENT DOCUMENTS
DE    102004032907 A1    2/2005
JP    06-020713    1/1994

OTHER PUBLICATIONS

German Office Action for Application No. 102007009905.5-45, dated Nov. 27, 2008.

\* cited by examiner

*Primary Examiner* — Patrick Ryan
*Assistant Examiner* — Ben Lewis
(74) *Attorney, Agent, or Firm* — Nelson Mullins Riley & Scarborough LLP; Anthony A. Laurentano

(57) ABSTRACT

A fuel gas flow field is formed on a surface of a rectangular first metal separator. The fuel gas flow field includes flow grooves extending in the direction of gravity. An outlet buffer is provided at a lower end of the fuel gas flow field. The outlet buffer includes an inclined surface inclined toward a fuel gas discharge passage. The fuel gas discharge passage is positioned below the outlet buffer. Outlet channel grooves are formed by ridges provided between the fuel gas discharge passage and the outlet buffer. Lower ends of the ridges are arranged in a zigzag pattern.

8 Claims, 8 Drawing Sheets

FIG. 2
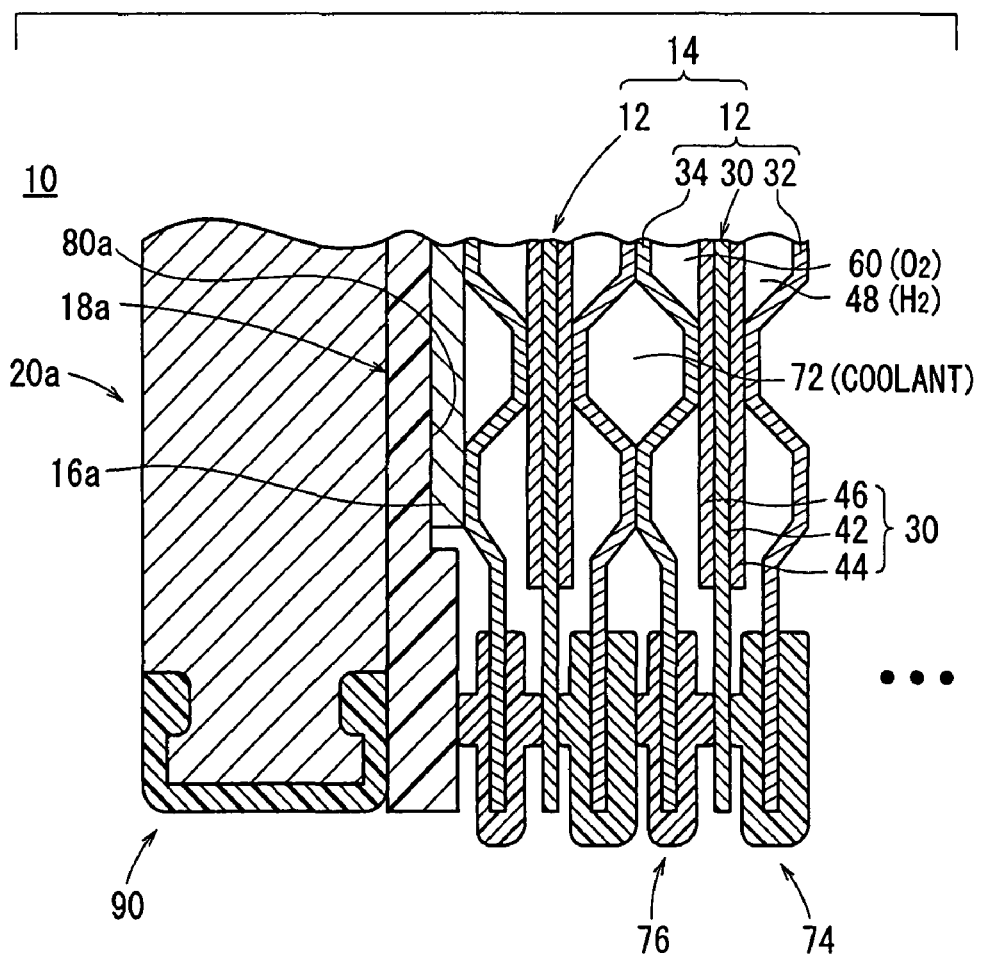
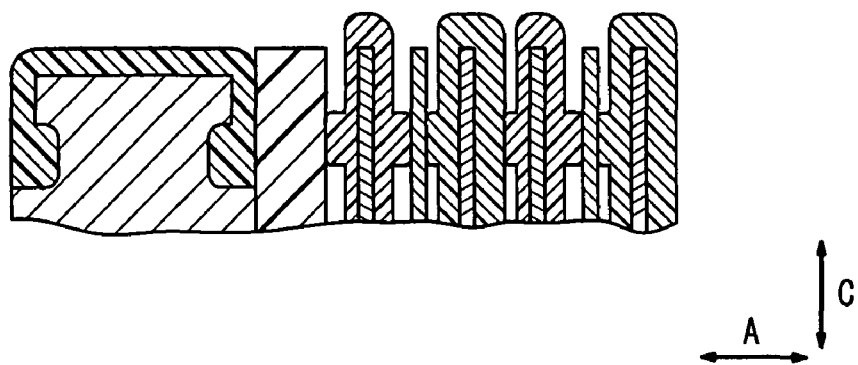

FUEL CELL

BACKGROUND OF THE INVENTION

1. Field of the Invention

The present invention relates to a fuel cell formed by stacking a membrane electrode assembly and a separator in a horizontal stacking direction. The membrane electrode assembly includes a pair of electrodes and an electrolyte membrane interposed between the electrodes. The separator has a rectangular shape including long sides extending in the direction of gravity and short sides extending horizontally in a direction perpendicular to the stacking direction. The separator has a reactant gas flow field for supplying one of reactant gases along an electrode surface in the direction of gravity.

2. Description of the Related Art

For example, a polymer electrolyte fuel cell employs a membrane electrode assembly (MEA) which includes an anode, a cathode, and an electrolyte membrane interposed between the anode and the cathode. The electrolyte membrane is a solid polymer ion exchange membrane. The membrane electrode assembly and separators sandwiching the membrane electrode assembly make up a unit of a power generation cell for generating electricity. In practical use of such a fuel cell, normally, a predetermined numbers of power generation cells are stacked together to form a fuel cell stack.

In the fuel cell, a fuel gas flow field for supplying a fuel gas to the anode, and an oxygen-containing gas flow field for supplying an oxygen-containing gas to the cathode are formed in the surfaces of the separator. Further, a coolant flow field as a passage of a coolant is formed between the separators along the surfaces of the separators.

In general, the fuel cell has internal manifold structure in which fluid supply passages and fluid discharge passages extending through the separators in the stacking direction are provided in the fuel cell. The fuel gas, the oxygen-containing gas, and the coolant as fluids are supplied to the fuel gas flow field, the oxygen-containing gas flow field, and the coolant flow field through the respective fluid supply passages, and then, discharged into the fluid discharge passages.

As the fuel cell having the internal manifold structure, for example, a fuel cell disclosed in Japanese Laid-Open Patent Publication No. 6-20713 is known. As shown in FIG. 8, the fuel cell includes a cell 1. The cell 1 has an air electrode 1*b*, a fuel electrode 1*c*, and a solid polymer membrane 1*a* interposed between the air electrode 1*b* and the fuel electrode 1*c*. Packings 2 are attached on both left and right sides of the cell 1. Main surfaces of the cell 1 and the packings 2 are sandwiched between a pair of separators 3. The separators 3 have fuel gas supply grooves 4 on a surface facing the fuel electrode 1*c*, and have oxygen-containing gas supply grooves 5 on a surface facing the air electrode 1*b*. The fuel gas supply grooves 4 and the oxygen-containing gas supply grooves 5 extend vertically.

A fuel gas supply passage 6*a* and an oxygen-containing gas supply passage 7*a* are provided at positions near upper corners of the separator 3, and a fuel gas discharge passage 6*b* and an oxygen-containing gas discharge passage 7*b* are provided at positions near lower corners of the separator 3.

The fuel gas supplied from the fuel gas supply passage 6*a* flows through the fuel gas supply grooves 4 downwardly in the direction of gravity, and the oxygen-containing gas supplied from the oxygen-containing gas supply passage 7*a* flows though the oxygen-containing gas supply grooves 5 downwardly in the direction of gravity.

However, in the conventional technique, the position of the fuel gas discharge passage 6*b* is above the lower end of the fuel gas supply grooves 4, and the position of the oxygen-containing gas discharge passage 7*b* is above the lower end of the oxygen-containing gas supply grooves 5. Therefore, water produced in the power generation reaction tends to be retained at the lower ends of the fuel gas supply grooves 4 and the oxygen-containing gas supply grooves 5. In particular, when operation of the fuel cell is stopped, and the fuel cell is exposed to the atmosphere at the temperature below the freezing point, the retained water freezes. Thus, due to expansion of the retained water, the fuel cell may be damaged undesirably.

SUMMARY OF THE INVENTION

A main object of the present invention is to provide a fuel cell having simple structure in which it is possible prevent water produced in power generation reaction from being retained in the fuel cell as much as possible, and the desired power generation performance and the durability are maintained advantageously.

The present invention relates to a fuel cell formed by stacking a membrane electrode assembly and a separator in a horizontal stacking direction. The membrane electrode assembly includes a pair of electrodes and an electrolyte membrane interposed between the electrodes. The separator has a rectangular shape including long sides extending in the direction of gravity and short sides extending horizontally in a direction perpendicular to the stacking direction. The separator has a reactant gas flow field for supplying one of reactant gases along an electrode surface in the direction of gravity.

The reactant gas flow field includes an inlet buffer at an upper position and an outlet buffer at a lower position. A reactant gas supply passage for supplying the one of reactant gases to the reactant gas flow field and a reactant gas discharge passage for discharging the reactant gas from the one of reactant gases flow field extend through the separator in the stacking direction. The reactant gas discharge passage is positioned below the outlet buffer, and at least the outlet buffer is inclined toward the reactant gas discharge passage.

In the structure, the reactant gas flow field comprises a long side extending in the direction of gravity, and the reactant gas flows through the reactant gas flow field in the direction of gravity. Therefore, the water produced in the power generation reaction is discharged smoothly by its own weight. The reactant gas discharge passage is provided below the outlet buffer, and the outlet buffer is inclined toward the reactant gas discharge passage. Thus, the water produced in the power generation reaction is not retained at the lower end of the reactant gas flow field, and smoothly and reliably discharged into the reactant gas discharge passage.

In particular, when operation is stopped, since the water produced in the power generation reaction is discharged into the reactant gas discharge passage by its own weight, the water is not retained in the fuel cell. Thus, with the simple structure, it is possible to prevent the damage of the fuel cell due to the frozen water retained in the fuel cell.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is partial cross sectional view showing the fuel cell stack;

DESCRIPTION OF THE PREFERRED EMBODIMENTS

Figure 1:
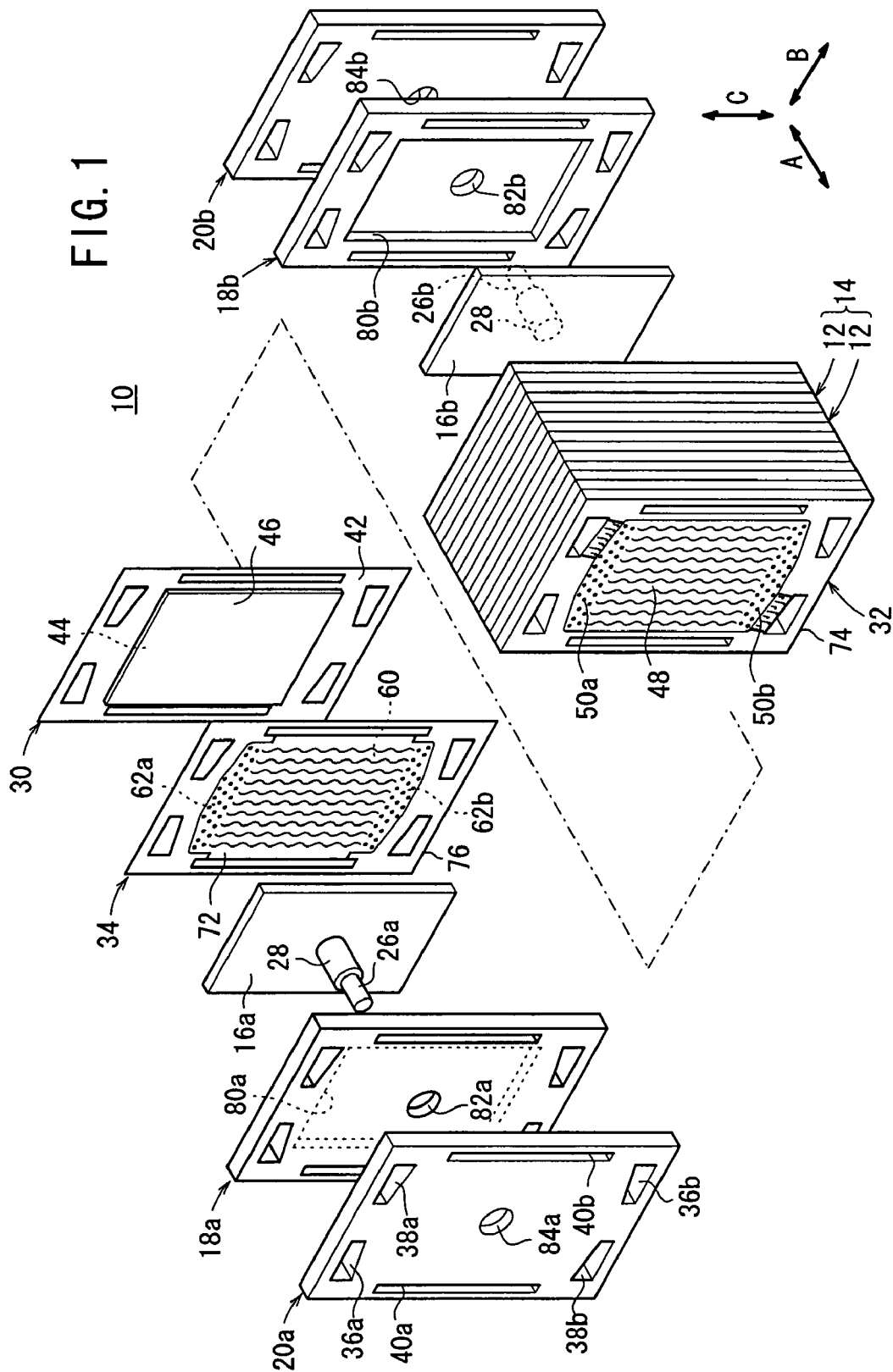
FIG. 1 is a partial exploded perspective view showing a fuel cell stack according to a first embodiment of the present invention.

FIG. 1 is a partial exploded perspective view showing a fuel cell stack (fuel cell) 10 according to a first embodiment of the present invention. FIG. 2 is a partial cross sectional view showing the fuel cell stack 10.

The fuel cell stack 10 includes a stack body 14 formed by stacking a plurality of unit cells 12 in a substantially horizontal direction indicated by an arrow A. At one end of the stack body 14 in the stacking direction, a terminal plate 16a is provided. An insulating plate 18a is provided outside the terminal plate 16a, and an end plate 20a is provided outside the insulating plate 18a.

At the other end of the stack body 14 in the stacking direction, a terminal plate 16b is provided. An insulating plate 18b is provided outside the terminal plate 16b, and an end plate 20b is provided outside the insulating plate 18b (see FIG. 1). For example, the fuel cell stack 10 is integrally held in a box-shaped casing (not shown) including the end plates 20a, 20b having a rectangular shape. Alternatively, components of the fuel cell stack 10 between the end plates 20a, 20b are integrally tightened by a plurality of tie rods (not shown) extending in the direction indicated by the arrow A.

A terminal 26a is provided at substantially the center of the terminal plate 16a, and a terminal 26b is provided at substantially the center of the terminal plate 16b. The terminals 26a, 26b are inserted into insulating cylinders 28 and extend outwardly from the end plates 20a, 20b, respectively.

Figure 3:
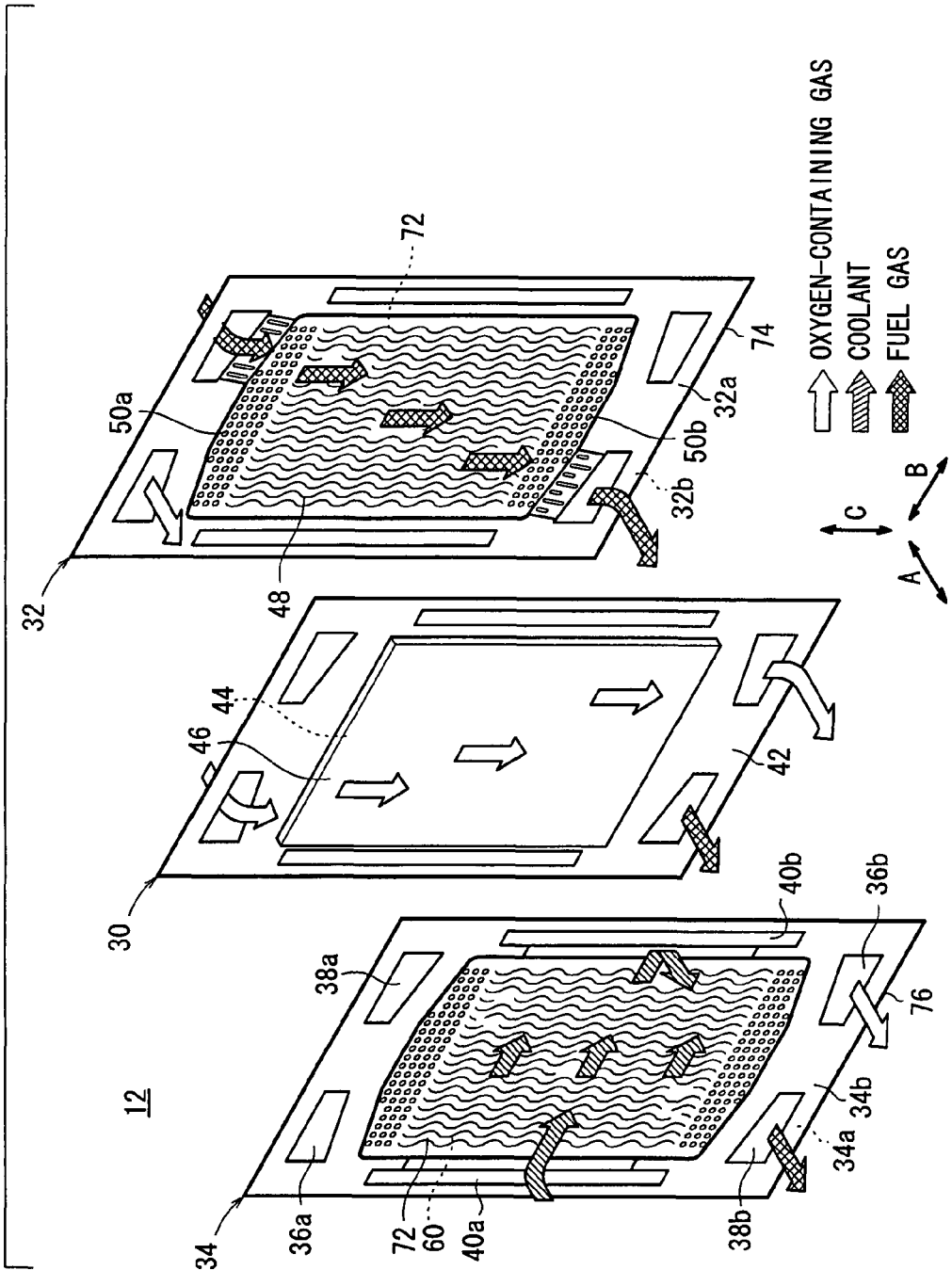
FIG. 3 is an exploded perspective view showing main components of a unit cell of the fuel cell stack.

As shown in FIGS. 2 and 3, each of the unit cells 12 includes a membrane electrode assembly (electrolyte electrode assembly) 30 and first and second metal separators 32, 34 sandwiching the membrane electrode assembly 30. The first and second metal separators 32, 34 are thin metal plates fabricated to have corrugated surfaces by press forming. Therefore, the first and second metal separators 32, 34 have ridges and grooves in cross section. Each of the first and second metal separators 32, 34 has a rectangular shape including long sides oriented in the direction of gravity indicated by an arrow C, and short sides oriented horizontally in a direction indicated by an arrow B.

At an upper end of the unit cell 12 in the longitudinal direction indicated by the arrow C in FIG. 3, an oxygen-containing gas supply passage (reactant gas supply passage) 36a for supplying an oxygen-containing gas, and a fuel gas supply passage (reactant gas supply passage) 38a for supplying a fuel gas such as a hydrogen-containing gas are provided. The oxygen-containing gas supply passage 36a and the fuel gas supply passage 38a extend through the unit cell 12 in the direction indicated by the arrow A.

At a lower end of the unit cell 12 in the longitudinal direction, a fuel gas discharge passage (reactant gas discharge passage) 38b for discharging a fuel gas and an oxygen-containing gas discharge passage (reactant gas discharge passage) 36b for discharging the oxygen-containing gas are provided. The fuel gas discharge passage 38b and the oxygen-containing gas discharge passage 36b extend through the unit cell 12 in the direction indicated by the arrow A.

At one end of the unit cell 12 in a lateral direction indicated by the arrow B, a coolant supply passage 40a for supplying a coolant is provided. At the other end of the unit cell 12 in the lateral direction, a coolant discharge passage 40b for discharging the coolant is provided. The coolant supply passage 40a and the coolant discharge passage 40b extend through the unit cell 12 in the direction indicated by the arrow A.

The membrane electrode assembly 30 includes an anode 44, a cathode 46, and a solid polymer electrolyte membrane 42 interposed between the anode 44 and the cathode 46. The solid polymer electrolyte membrane 42 is formed by impregnating a thin membrane of perfluorosulfonic acid with water, for example.

Each of the anode 44 and the cathode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 44 and the electrode catalyst layer of the cathode 46 are fixed to both surfaces of the solid polymer electrolyte membrane 42, respectively.

Figure 4:
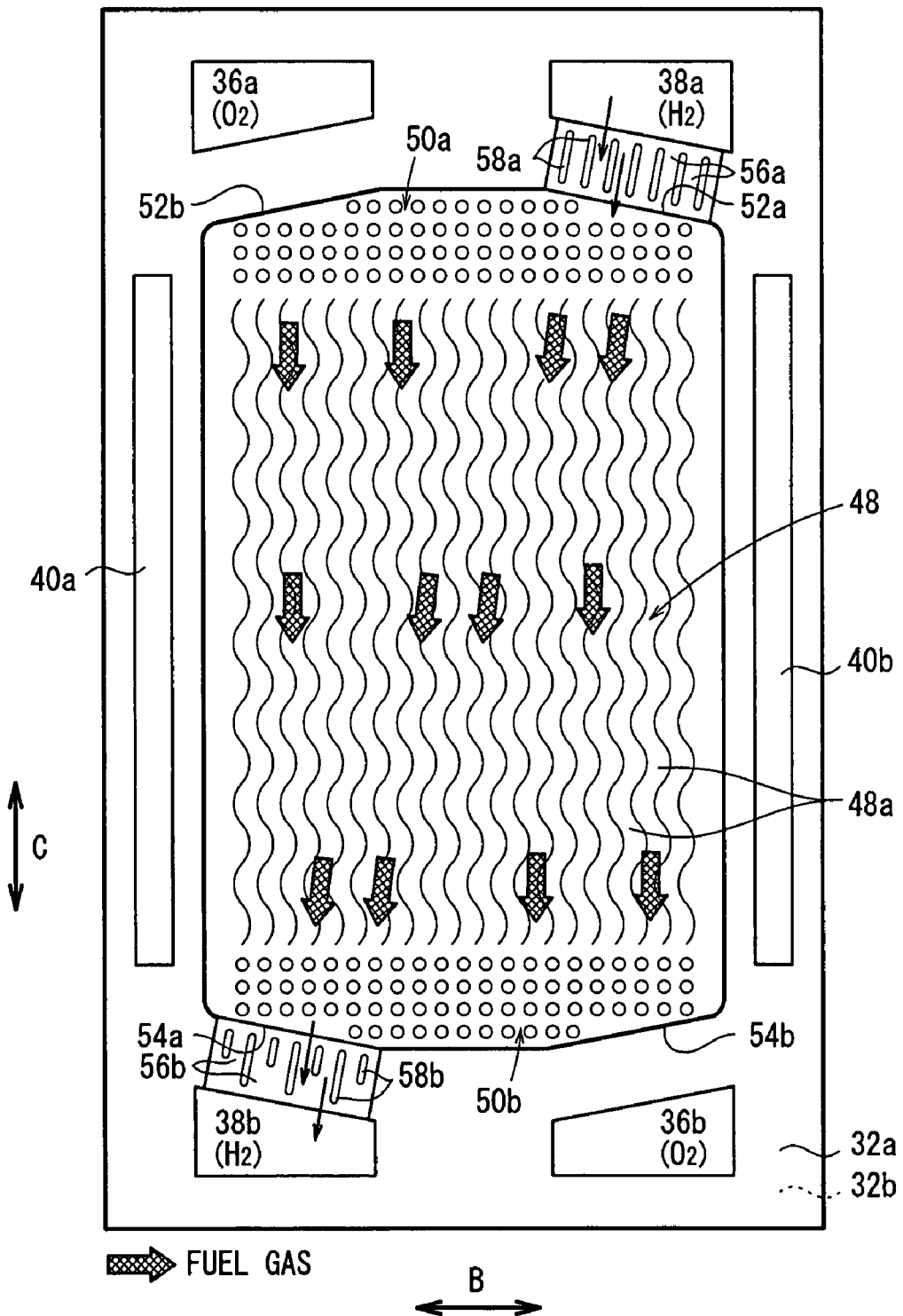
FIG. 4 is a front view showing a first metal separator of the unit cell.

The first metal separator 32 has a fuel gas flow field 48 on its surface 32a facing the membrane electrode assembly 30. The fuel gas flow field 48 is connected to the fuel gas supply passage 38a at one end, and connected to the fuel gas discharge passage 38b at the other end. As shown in FIGS. 3 and 4, the fuel gas flow field 48 includes a plurality of wavy flow grooves 48a extending in the direction indicated by the arrow C. An inlet buffer 50a and an outlet buffer 50b are provided at upper and lower ends of the wavy flow grooves 48a. A plurality of bosses are provided in the inlet buffer 50a and the outlet buffer 50b.

The inlet buffer 50a includes inclined surfaces 52a, 52b inclined toward the fuel gas supply passage 38a and the oxygen-containing gas supply passage 36a. The outlet buffer 50b includes inclined surfaces 54a, 54b inclined toward the fuel gas discharge passage 38b and the oxygen-containing gas discharge passage 36b. The fuel gas supply passage 38a is provided above the upper end of the inlet buffer 50a and the fuel gas discharge passage 38b is provided below the lower end of the outlet buffer 50b.

A plurality of inlet channel grooves 56a are formed by a plurality of ridges 58a provided between the fuel gas supply passage 38a and the inlet buffer 50a. The inlet channel grooves 56a are inclined toward the fuel gas supply passage 38a. Likewise, a plurality of outlet channel grooves 56b are formed by a plurality of ridges 58b provided between the fuel gas discharge passage 38b and the outlet buffer 50b. The outlet channel grooves 56b are inclined toward the fuel gas discharge passage 38b. Lower ends of the ridges 58b are arranged in a zigzag pattern. Each of the lower ends of the ridges 58b has a curved end surface (R-surface).

Figure 5:
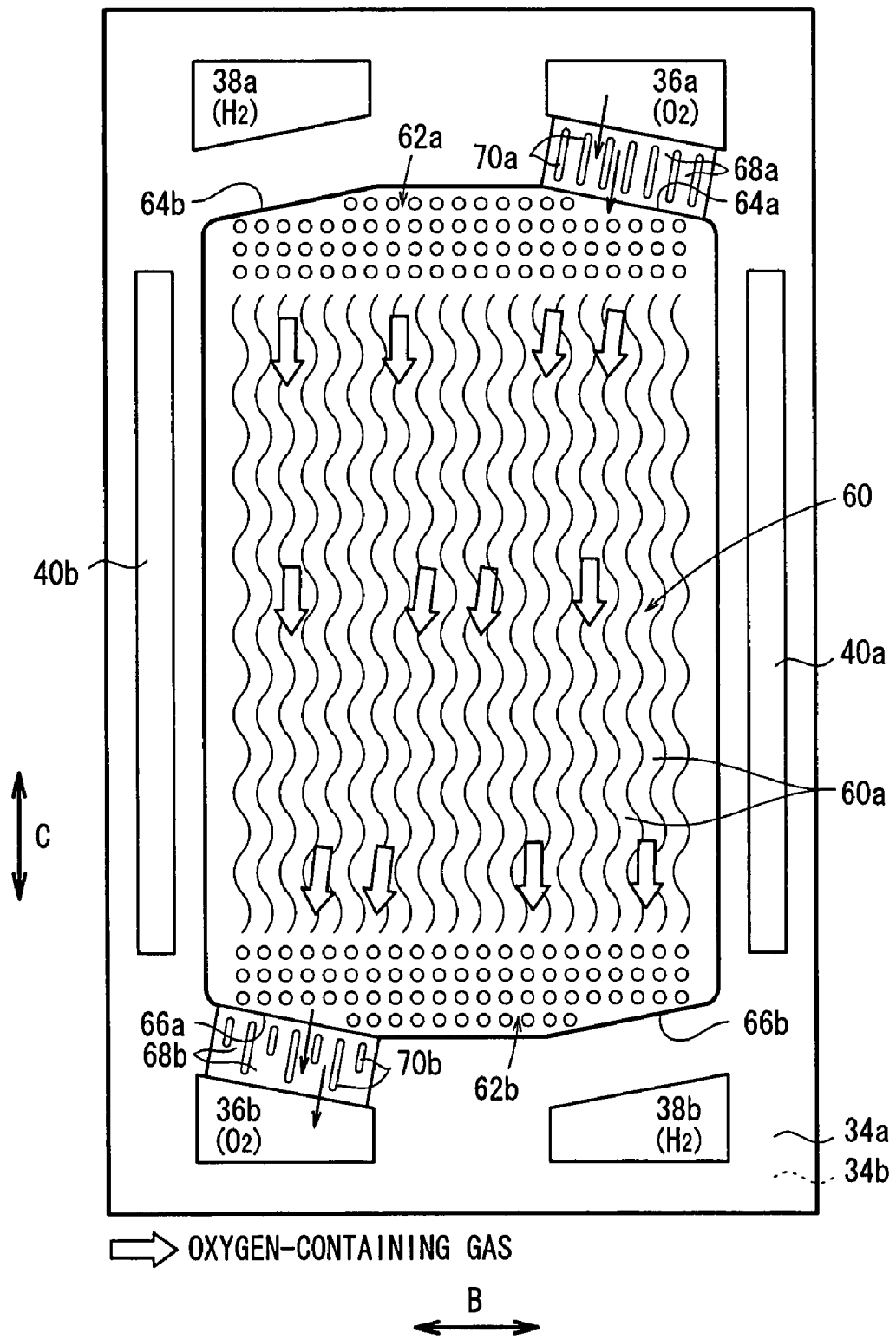
FIG. 5 is a front view showing a second metal separator of the unit cell.

As shown in FIG. 5, the second metal separator 34 has an oxygen-containing gas flow field 60 on its surface 34a facing the membrane electrode assembly 30. The oxygen-containing gas flow field 60 is connected to the oxygen-containing gas supply passage 36a at one end, and connected to the oxygen-containing gas discharge passage 36b at the other end. The oxygen-containing gas flow field 60 includes a plurality of wavy flow grooves 60a extending in the direction indicated by the arrow C. An inlet buffer 62a and an outlet buffer 62b are provided at upper and lower ends of the wavy flow grooves 60a. A plurality of bosses are provided in the inlet buffer 62a and the outlet buffer 62b.

The inlet buffer 62a includes inclined surfaces 64a, 64b inclined toward the oxygen-containing gas supply passage 36a and the fuel gas supply passage 38a. The outlet buffer 62b includes inclined surfaces 66a, 66b inclined toward the oxygen-containing gas discharge passage 36b and the fuel gas discharge passage 38b. The oxygen-containing gas supply passage 36a is provided above the upper end of the inlet buffer 62a and the oxygen-containing gas discharge passage 36b is provided below the lower end of the outlet buffer 62b.

A plurality of inlet channel grooves 68a are formed by a plurality of ridges 70a provided between the oxygen-containing gas supply passage 36a and the inlet buffer 62a. The inlet channel grooves 68a are inclined toward the oxygen-containing gas supply passage 36a. Likewise, a plurality of outlet channel grooves 68b are formed by a plurality of ridges 70b provided between the oxygen-containing gas discharge passage 36b and the outlet buffer 62b. The outlet channel grooves 68b are inclined toward the oxygen-containing gas discharge passage 36b. Lower ends of the ridges 70b are arranged in a zigzag pattern. Each of the lower ends of the ridges 70b has a curved end surface (R-surface).

A coolant flow field 72 is formed between a surface 34b of the second metal separator 34 and a surface 32b of the first metal separator 32 (see FIG. 3). The coolant flow field 72 is connected between the coolant supply passage 40a and the coolant discharge passage 40b. The coolant flow field 72 is formed by stacking the corrugated back surface of the fuel gas flow field 48 and the corrugated back surface of the oxygen-containing gas flow field 60. The grooves in the coolant flow field 72 extend in the direction indicated by the arrow B.

A first seal member 74 is formed integrally on the surfaces 32a, 32b of the first metal separator 32 around the outer end of the first metal separator 32. Further, a second seal member 76 is formed integrally on the surfaces 34a, 34b of the second metal separator 34 around the outer end of the second metal separator 34 (see FIG. 3).

In FIGS. 1 and 2, the insulating plates 18a, 18b are made of insulating material such as polycarbonate (PC) or phenol resin. A rectangular recess 80a is formed at the center of the insulating plate 18a, and a rectangular recess 80b is formed at the center of the insulating plate 18b. A hole 82a is formed at substantially the center of the recess 80a, and a hole 82b is formed at substantially the center of the recess 80b.

The terminal plates 16a, 16b are placed in the recesses 80a, 80b, respectively. The terminals 26a, 26b of the terminal plates 16a, 16b are inserted into the holes 82a, 82b through the insulating cylinders 28, respectively. Holes 84a, 84b are formed coaxially with the holes 82a, 82b at substantially the center of the end plates 20a, 20b.

As shown in FIG. 2, seal members (e.g., gaskets 90) are provided on the inner surfaces forming the oxygen-containing gas supply passage 36a, the fuel gas supply passage 38a, the coolant supply passage 40a, the oxygen-containing gas discharge passage 36b, the fuel gas discharge passage 38b, and the coolant discharge passage 40b.

Next, operation of the fuel cell stack 10 will be described below.

Firstly, as shown in FIG. 1, the oxygen-containing gas is supplied to the oxygen-containing gas supply passage 36a of the end plate 20a, and the fuel gas is supplied to the fuel gas supply passage 38a of the end plate 20a. Further, the coolant such as pure water or ethylene glycol is supplied to the coolant supply passage 40a of the end plate 20a. Thus, in the stack body 14, the oxygen-containing gas, the fuel gas, and the coolant are supplied to the unit cells 12 stacked in the direction indicated by the arrow A.

As shown in FIGS. 3 and 5, the oxygen-containing gas from the oxygen-containing gas supply passage 36a flows into the oxygen-containing gas flow field 60 of the second metal separator 34, and flows along the cathode 46 of the membrane electrode assembly 30.

At this time, as shown in FIG. 5, on the surface 34a of the second metal separator 34, the oxygen-containing gas from the oxygen-containing gas supply passage 36a flows through the inlet channel grooves 68a formed between the ridges 70a, and is supplied to the inlet buffer 62a. The oxygen-containing gas supplied to the inlet buffer 62a is distributed separately in the direction indicated by the arrow B, into the wavy flow grooves 60a of the oxygen-containing gas flow field 60. Then, the oxygen-containing gas flows through the wavy flow grooves 60a downwardly, along the cathode 46 of the membrane electrode assembly 30.

As shown in FIGS. 3 and 4, on the surface 32a of the first metal separator 32, the fuel gas from the fuel gas supply passage 38a flows through the inlet channel grooves 56a formed between the ridges 58a, and is supplied to the inlet buffer 50a. The fuel gas supplied to the inlet buffer 50a is distributed separately in the direction indicated by the arrow B, into the wavy flow grooves 48a of the fuel gas flow field 48. Then, the fuel gas flows through the wavy flow grooves 48a downwardly, along the anode 44 of the membrane electrode assembly 30.

Thus, in each of the membrane electrode assemblies 30, the oxygen-containing gas supplied to the cathode 46, and the fuel gas supplied to the anode 44 are consumed in the electrochemical reactions at catalyst layers of the cathode 46 and the anode 44 for generating electricity (see FIG. 2).

Then, as shown in FIG. 5, the oxygen-containing gas consumed at the cathode 46 flows into the outlet buffer 62b connected to the lower end of the oxygen-containing gas flow field 60. Further, the oxygen-containing gas from the outlet buffer 62b flows through the outlet channel grooves 68b formed between the ridges 70b into the oxygen-containing gas discharge passage 36b.

Likewise, as shown in FIGS. 3 and 4, the fuel gas consumed at the anode 44 flows into the outlet buffer 50b connected to the lower end of the fuel gas flow field 48. Further, the fuel gas from the outlet buffer 50b flows through the outlet channel grooves 56b formed between the ridges 58b into the fuel gas discharge passage 38b.

Further, after the coolant flows from the coolant supply passage 40a into the coolant flow field 72 between the first and second metal separators 32, 34, the coolant flows in the horizontal direction indicated by the arrow B. After the coolant cools the membrane electrode assembly 30, the coolant is discharged into the coolant discharge passage 40b.

In the first embodiment, for example, as shown in FIG. 5, the second metal separator 34 has a rectangular shape, and the long sides of the second metal separator 34 are oriented in the direction of the gravity indicated by the arrow C. The oxygen-containing gas flow field 60 comprises the wavy flow grooves 60a extending in the direction of gravity. In the structure, though a relatively large amount of water is produced in the power generation reaction, since the oxygen-containing gas flows in the direction of gravity, the water produced in the power generation reaction is reliably discharged downwardly along the wavy flow grooves 60a by its own weight.

Further, the outlet buffer 62b is provided below the oxygen-containing gas flow field 60, and the oxygen-containing gas discharge passage 36*b* is provided below the outlet buffer 62*b* through the outlet flow grooves 68*b*. Therefore, when the water produced in the power generation reaction in the oxygen-containing gas flow field 60 is discharged into the oxygen-containing gas discharge passage 36*b*, the oxygen-containing gas is not retained in the area below the oxygen-containing gas flow field 60 or in the outlet buffer 62*b*.

The outlet buffer 62*b* has the inclined surface 66*a* inclined toward the oxygen-containing gas discharge passage 36*b*. The outlet flow grooves 68*b* inclined from the inclined surface 66*a* toward the oxygen-containing gas discharge passage 36*b* are provided.

In the structure, the water produced in the power generation reaction flows from the lower end of the oxygen-containing gas flow field 60 to the outlet buffer 62*b*. The water flows smoothly into the oxygen-containing gas discharge passage 36*b* through the outlet channel grooves 68*b* while reliably preventing the water from being retained undesirably.

In particular, when operation of the fuel cell stack 10 is stopped, since the water produced in the oxygen-containing gas flow field 60 is discharged into the oxygen-containing gas discharge passage 36*b* by its own weight, the water is not retained in the unit cell 12. Thus, it is possible to prevent the damage of the unit cell 12 due to the frozen water retained in the unit cell 12.

Further, also in the fuel gas flow field 48 as shown in FIG. 4, the same advantages as in the case of the oxygen-containing gas flow field 60 can be obtained. Moreover, in the other embodiments as described later, the same advantages can be obtained.

Further, in the first embodiment, the oxygen-containing gas flow field 60 includes the wavy flow grooves 60*a*. In the structure, the length of the flow grooves 60*a* of the oxygen-containing gas flow field 60 become large in comparison with the case of adopting straight flow grooves. Thus, the pressure loss in the oxygen-containing gas flow field 60 is increased, and the flow rate of the oxygen-containing gas is increased. Accordingly, the water is discharged from the oxygen-containing gas flow field 60 smoothly.

Further, since the oxygen-containing gas flows along the wavy flow grooves 60*a* in the direction indicated by the arrow C, the flow direction of the oxygen-containing gas changes in a wavy manner. In the structure, the oxygen-containing gas is diffused efficiently at the cathode 46, and improvement in the power generation performance is achieved.

Further, the lower ends of the ridges 70*b* forming the outlet channel grooves 68*b* are arranged in a zigzag pattern. Therefore, the intervals between the lower end positions of the ridges 70*b* are increased. In the structure, the water moving downwardly by its own weight is not retained as water droplets, and reliably discharged from the outlet channel grooves 68*b*. Since the lower end of the ridge 70*b* has a curved surface (R-surface), it is possible to further reliably prevent the water droplets from being kept at the lower end of the ridge 70*b*.

Figure 6:
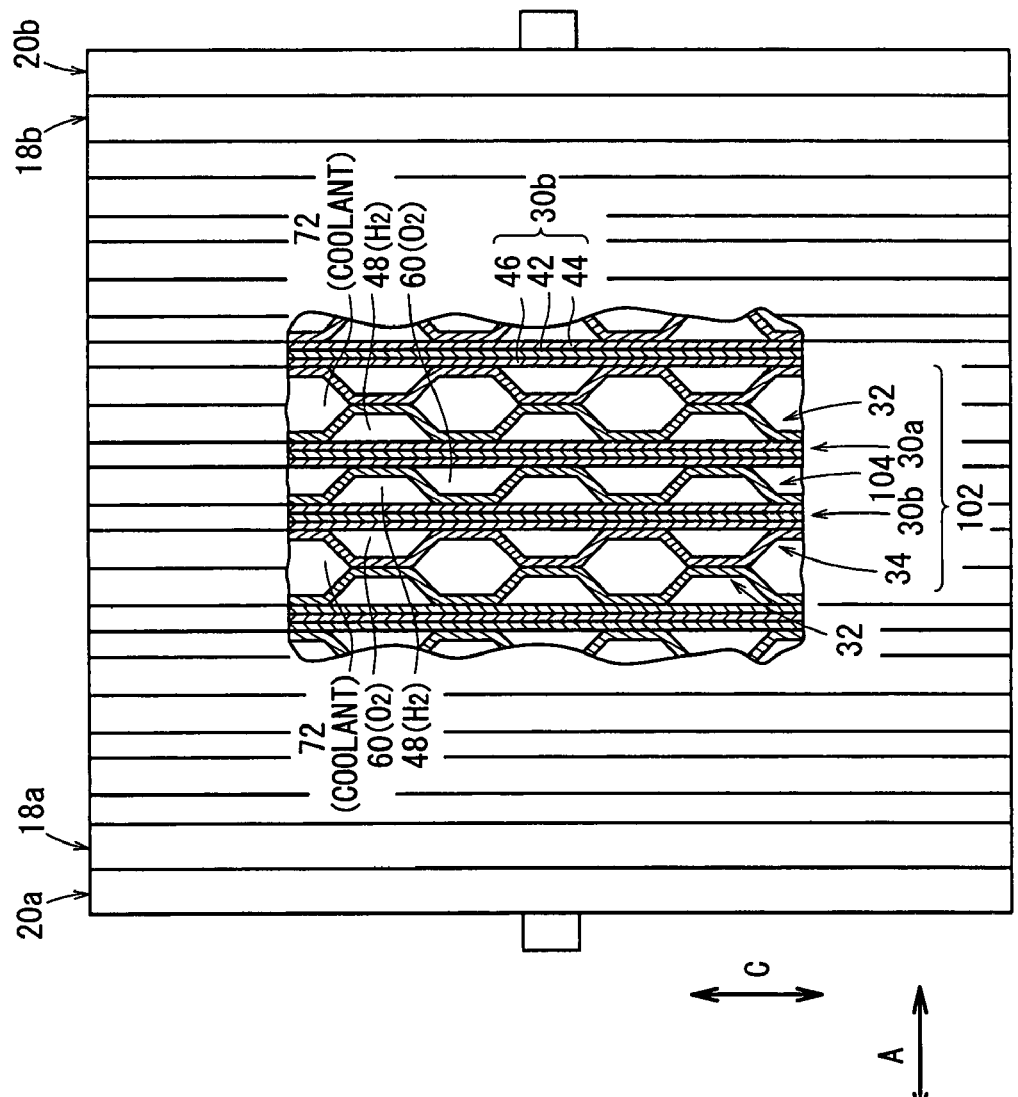
FIG. 6 is a cross sectional view showing a fuel cell stack according to a second embodiment of the present invention.

FIG. 6 is a partial cross sectional view showing a fuel cell stack (fuel cell) 100 according to a second embodiment of the present invention. The constituent elements that are identical to those of the fuel cell stack 10 according to the first embodiment are labeled with the same reference numeral, and description thereof will be omitted.

The fuel cell stack 100 is formed by stacking a plurality of cell units 102 in a horizontal direction. Each of the cell units 102 is formed by stacking a first metal separator 32, a first membrane electrode assembly 30*a*, a third metal separator 104, a second membrane electrode assembly 30*b*, and a second metal separator 34 in a direction indicated by an arrow A.

The first and second membrane electrode assemblies 30*a*, 30*b* have the same structure as that of the membrane electrode assembly 30.

The third metal separator 104 has an oxygen-containing gas flow field 60 (having the same structure as that shown in FIG. 5) on its surface facing the first membrane electrode assembly 30*a*, and a fuel gas flow field 48 (having the same structure as that shown in FIG. 4) on its surface facing the second membrane electrode assembly 30*b*.

In the second embodiment, no coolant flow field 72 is provided between the first and second membrane electrode assemblies 30*a*, 30*b*, and the so-called skipping cooling structure is adopted. Thus, the same effect as in the case of the first embodiment can be obtained. For example, the overall size of the fuel cell stack 100 in the stacking direction is reduced effectively.

Figure 7:
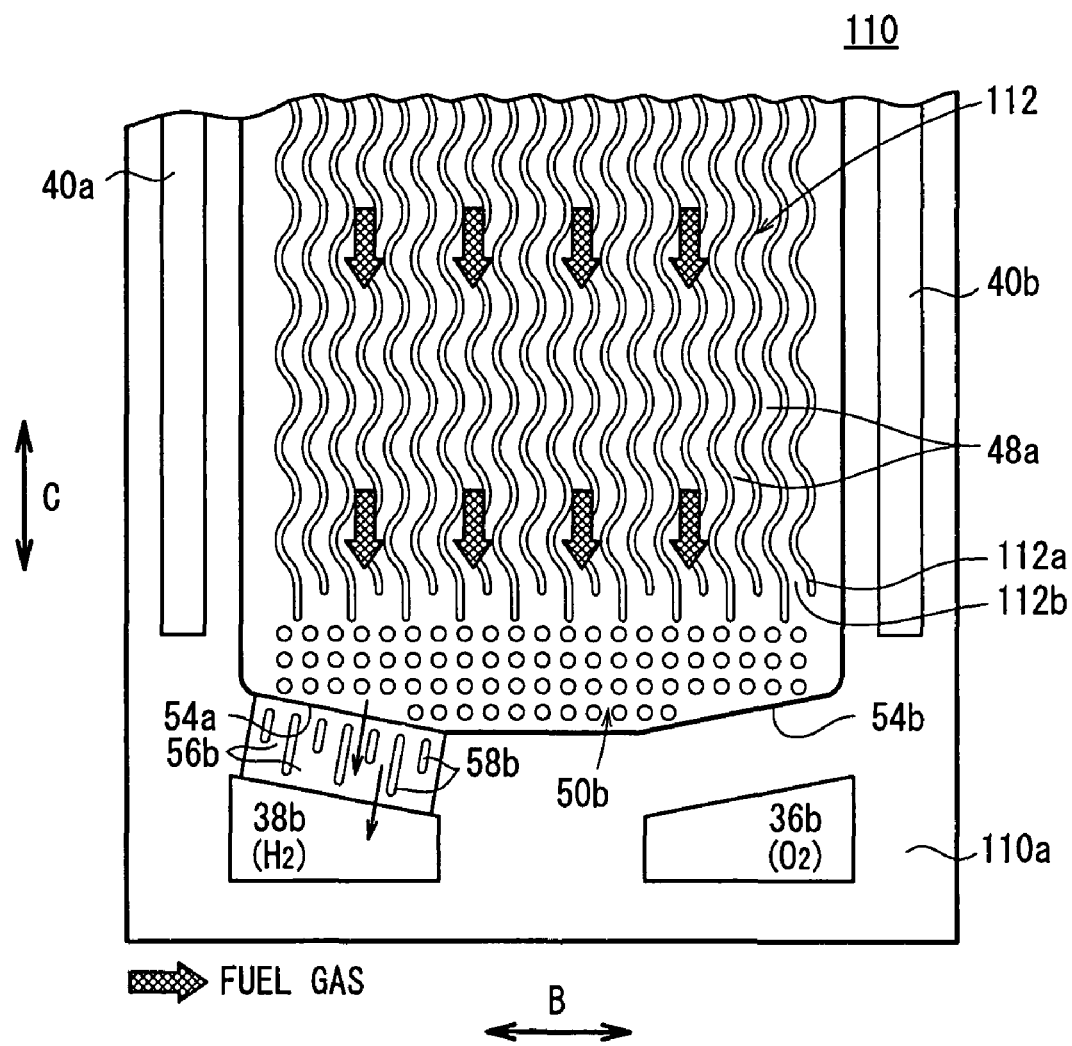
FIG. 7 is a partial front view showing a first metal separator of a fuel cell stack according to a third embodiment of the present invention.
Figure 8:
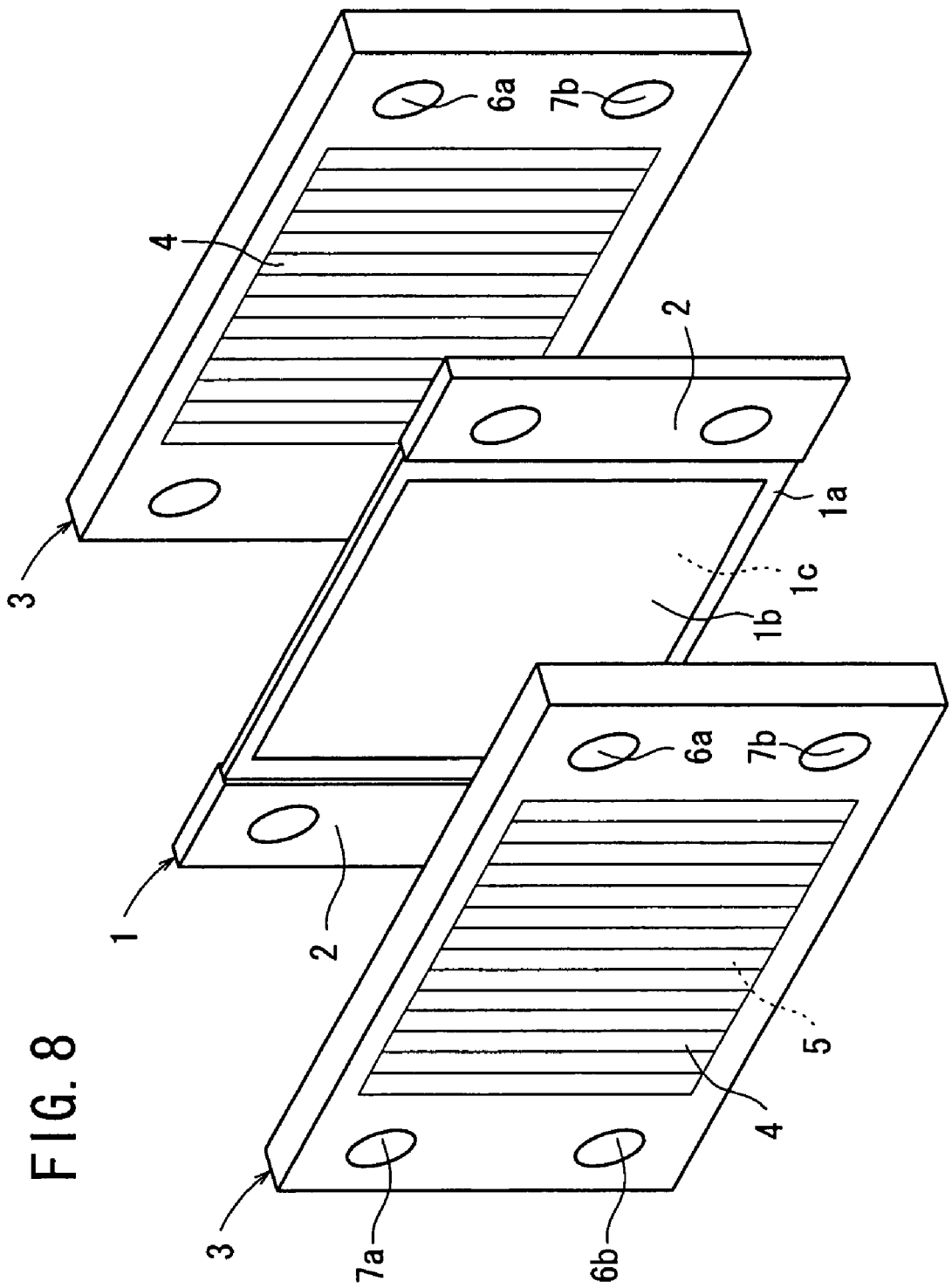
FIG. 8 is a perspective view showing main components of a conventional fuel cell.

FIG. 7 is a partial front view showing a first metal separator 110 of a fuel cell stack according to a third embodiment of the present invention. The constituent elements that are identical to those of the first metal separator 32 according to the first embodiment are labeled with the same reference numeral, and description thereof will be omitted.

The first metal separator 110 has a fuel gas flow field 112 on its surface 110*a* facing the membrane electrode assembly 30. The fuel gas flow field 112 includes a plurality of wavy ridges 112*a* and a plurality of wavy flow grooves 112*b* alternately. The lower ends of the wavy ridges 112*a* are arranged in a zigzag pattern. Each of the lower ends of the wavy ridges 112*a* has a curved end surface (R-surface).

Though not shown, the second metal separator has the same structure as that of the first metal separator 110.

In the third embodiment, the fuel gas flow field 112 is formed by the wavy ridges 112*a*, and the lower ends of the wavy ridges 112*a* are arranged in a zigzag pattern. Therefore, when the water produced in the power generation reaction moves downwardly along the wavy ridges 112*a* by its own weight, the water is not retained in the fuel gas flow field 112 as water droplets, and the water is smoothly discharged into the outlet buffer 50*b*. The lower end of the wavy ridge 112*a* has a curved end surface (R-surface). In the structure, it is possible to further reliably prevent the water droplets from being kept at the lower end of the wavy ridge 112*a*.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking a membrane electrode assembly and a separator in a horizontal stacking direction, said membrane electrode assembly including a pair of electrodes and an electrolyte membrane interposed between said electrodes, said separator having a rectangular shape including long sides extending in the direction of gravity and short sides extending horizontally in a direction perpendicular to the stacking direction, said separator having a reactant gas flow field for supplying a reactant gas along an electrode surface in the direction of gravity, wherein an inlet buffer is provided above the reactant gas flow field and an outlet buffer is provided below the reactant gas flow field, the inlet buffer and the outlet buffer extend along an entire width of the reactant gas flow field;

a reactant gas supply passage for supplying the reactant gas to said reactant gas flow field and a reactant gas discharge passage for discharging the reactant gas from the reactant gas flow field extend through said separator in the stacking direction;

a lower edge of said outlet buffer includes a first inclined surface extending downward from one end of the lower edge and a second inclined surface extending downward from another end of the lower edge;

said reactant gas discharge passage is positioned below said outlet buffer, the first inclined surface is connected to the reactant gas discharge passage through an outlet channel portion, and the first inclined surface is parallel to an inclined surface of said reactant gas discharge passage;

said reactant gas flow field extends in the direction of gravity; and the reactant gas flows continuously downward from an upper end to a lower end of the reactant gas flow field along the direction of gravity.

2. A fuel cell according to claim 1, wherein said reactant gas supply passage is positioned above said inlet buffer.

3. A fuel cell according to claim 1, wherein said reactant gas flow field comprises a plurality of wavy flow grooves; and a coolant flow field is provided for supplying a coolant horizontally to cool the electrode surface.

4. A fuel cell according to claim 1, wherein said outlet channel portion comprises a plurality of outlet channel grooves formed by ridges between said first inclined surface of said outlet buffer and said reactant gas discharge passage; and lower ends of said ridges are arranged in a zigzag pattern.

5. A fuel cell according to claim 4, wherein the lower end of said ridge has a curved end surface.

6. A fuel cell according to claim 3, wherein said coolant flow field is sandwiched between a plurality of said membrane electrode assemblies.

7. A fuel cell according to claim 3, wherein said reactant gas flow field comprises a plurality of wavy flow grooves and a plurality of wavy ridges; and lower ends of said wavy ridges are arranged in a zigzag pattern.

8. A fuel cell according to claim 7, wherein the lower end of said wavy ridge has a curved end surface.

* * * * *